US006968160B2

(12) United States Patent
Boos et al.

(10) Patent No.: US 6,968,160 B2
(45) Date of Patent: Nov. 22, 2005

(54) TELEMETRY SYSTEM WITH TRANSMITTER HOLDING POSITION ASSIGNMENT

(75) Inventors: Andreas Boos, Bondorf (DE); Werner Jacoby, Nufringen (DE); Markus Wollschlager, Sindelfingen (DE)

(73) Assignee: Koninklijke Philips Electronics N.V., Eindhoven (NL)

( * ) Notice: Subject to any disclaimer, the term of this patent is extended or adjusted under 35 U.S.C. 154(b) by 480 days.

(21) Appl. No.: 09/758,542

(22) Filed: Jan. 12, 2001

(65) Prior Publication Data

US 2001/0027088 A1    Oct. 4, 2001

(30) Foreign Application Priority Data

Jan. 15, 2000    (EP)    ............................ 00100773

(51) Int. Cl.⁷ .............................................. H04B 1/38
(52) U.S. Cl. .................... 455/90.1; 455/450; 455/41.2; 455/509; 455/575.4; 455/100; 455/357
(58) Field of Search ................... 455/556.1, 556.2, 455/557, 558, 559, 566, 414.1–414.4, 466, 455/41.2, 344, 348, 349, 351, 435.1, 450, 455/507–509, 517–521, 66.1, 561, 562.1, 455/575.1, 575.4, 90.1–90.3, 100, 357; 710/301, 710/303, 304, 302; 379/166.01, 106.03

(56) References Cited

U.S. PATENT DOCUMENTS

| | | | | |
|---|---|---|---|---|
| 5,423,086 A | * | 6/1995 | Cannon et al. | 455/186.1 |
| 5,475,846 A | * | 12/1995 | Moore | 710/260 |
| 5,655,148 A | * | 8/1997 | Richman et al. | 710/8 |
| 5,907,686 A | * | 5/1999 | Zenda | 710/301 |
| 6,243,589 B1 | * | 6/2001 | Novel | 455/466 |
| 6,496,892 B1 | * | 12/2002 | Lake et al. | 710/301 |
| 6,519,670 B1 | * | 2/2003 | Meiyappan | 710/305 |
| 6,544,171 B2 | * | 4/2003 | Beetz et al. | 600/300 |
| 6,557,108 B1 | * | 4/2003 | Moore et al. | 713/500 |

FOREIGN PATENT DOCUMENTS

EP    0 864 293 A1    9/1998

* cited by examiner

Primary Examiner—Charles Craver
(74) Attorney, Agent, or Firm—Thomas M. Lundin

(57) ABSTRACT

Disclosed is a telemetry system (10) with a receiver unit (50) and a plurality of transmitters (20–40), each adapted for providing a wireless communicating with the receiver unit (50). The receiver unit (50) comprises a plurality of transmitter holding positions (52–56), such as insertion slots, for receiving one of the transmitters (20–40), and means for assigning one of the transmitter holding positions (52–56) to the transmitter (20–40) received in the assigned transmitter holding position (52–56).

17 Claims, 3 Drawing Sheets

TELEMETRY SYSTEM WITH TRANSMITTER HOLDING POSITION ASSIGNMENT

BACKGROUND OF THE INVENTION

The present invention relates to telemetry systems in general and more particularly to telemetry systems for medical purposes.

Telemetry is generally defined as a (more or less automated) communications process by which measurements are made and/or other data collected at remote or inaccessible points, and transmitted to a receiving equipment for monitoring, display, and/or recording. Originally, the information was sent over wires, but modern telemetry systems more commonly use radio transmission. Basically, the communication process is the same in either case. Among the major applications are monitoring electric-power plants, gathering meteorological data, monitoring manned and unmanned space flights, and more and m ore medical applications such as pulsoximetry or electrocardiography.

Telemetry systems normally comprise a transmitter for transmitting electromagnetic signals, e.g. from a measurement, and a receiver for receiving the electromagnetic signals from the transmitter. In current medical telemetry systems, the transmitter is usually carried by the patient and the receiver is typically installed in an operator room. Large systems may have a multitude of transmitters and receivers.

Patient monitoring with telemetry system gets more and more popular in many medical areas. Monitoring by telemetry has some advantages over conventionally monitoring especially for patients who need not necessarily stay in their bed but nevertheless must be monitored continuously. Advantages are present from a medical point of view as well as for the patient comfort.

For such a medical telemetry system with one or more transmitters and a multi-channel or multi-parameter receiver for a continuous wireless monitoring of one or more physiological parameters, it is desired to have a clear assignment and labeling of each transmitter and receiver channel, in particular for the following reasons:

For each transmission channel, display elements are provided on the receiver showing the actual status of the link and/or status and possible parameter information of active transmitters. A clear relation between the display elements on the receiver and the corresponding active transmitters allows an easy operation of the system. Comprehensible display elements are required especially in case of failure to allow an easy identification of faulty or disturbed transmission channels. Possible failures could be empty batteries in the transmitters, technical defects in the transmitter or receiver channel or interfering signals.

There might also be more than one patient in a room, and therefore more than one telemetry system can be active at the same time. A clear and easy identification of which transmission channel belongs to which patient and to which transmitter is required.

The same applies if a multi-channel receiver, which has several independent receiver channels in one unit, is used. Such a receiver is used to receive different transmitter signals to monitor several physiological signals from one patient or to receive different signals from different patients simultaneously.

In most known telemetry systems, a static labeling of transmitters and receiver channels (e.g. with adhesive printed labels) is used to solve the assignment and identification problem as outlined above. Typically, this labeling is done by applying channel numbers, alphanumeric codes or symbols to each transmitter and the corresponding receiver or receiver channel. A static assignment, however, has some major disadvantages:

There is no flexibility when using several similar systems simultaneously because a certain transmitter can only be used with its own dedicated receiver or receiver channel. Exchanging transmitters between different systems is not possible.

There is no possibility to replace a defective transmitter with an arbitrary one. The system can only be used again after repairing the faulty device.

The same also applies for the replacement of a receiver.

To get certain flexibility it is necessary to have several systems with identical measurement capabilities to be able to replace a system completely in case of a failure. This, however, increases the overall costs because all systems must have the maximum possible measurement capabilities.

An automatic channel assignment in a telemetry system is disclosed in EP-A-864293 by the same applicant. A transmitter provides a wireless data transmission with a receiver. For assigning a transmission channel to the transmitter and/or to the receiver, the receiver comprises a receiver contact unit for providing a data communication with a transmitter contact unit of the transmitter. The data communication between the contact units is independent of the wireless data transmission between transmitter and receiver. The channel assignment is executed automatically during a contact phase, wherein the receiver contact unit and the transmitter contact unit are brought into contact.

Although such an automatic channel assignment already represents a major improvement over conventional telemetry systems with manual assignment of transmission channels, a clear assignment and identification between transmitters and receivers is still in the responsibility of the using personnel. In particular in clinical environments, this has been proved to be source of failures, malfunctions, and, worse, misinterpretations of clinical measuring and monitoring results.

SUMMARY OF THE INVENTION

It is an object of the invention to provide an improved telemetry system in particular with respect to assignment and identification of transmitters and receivers. The object is solved by the independent claims. Preferred embodiments are shown by the dependent claims.

According to the invention, a telemetry system comprises a receiver unit adapted for physically receiving a plurality of transmitters, each in a respective transmitter holding position, such as a slot or the like. The receiver unit is adapted for providing a wireless data transmission with each of the plurality of transmitters, at least with as many as the receiver unit is furnished with individual transmitter holding positions. Each transmitter assigned to provide a communication with the receiver is further assigned to a respective transmitter holding position of that receiver. The assignment of each transmitter to a respective transmitter holding position can be done manually or automatically.

The assignment between each transmitter and the respective transmitter holding position will be maintained, preferably until a new assignment between a transmitter (either the same or a different one) to a respective transmitter holding position (either the same or a different one) will be made, or until the present assignment is reset or otherwise suspended or canceled. The receiver unit and/or each transmitter preferably comprises warning indications for providing (preferably optical and/or acoustical) warning signals whenever one of the transmitters is placed into a wrong transmitter holding position (either in the same or another receiver unit) to which it has not been assigned to.

A manual transmitter holding position assignment is preferably accomplished by switches, thumb wheels, keys or touchpads with or without display feedback (softkeys).

For accomplishing an automatic assignment of a transmitter to a respective transmitter holding position, the receiver unit preferably comprises a receiver contact unit for each transmitter holding position. Each receiver contact unit is adapted to provide a data communication with a corresponding transmitter contact unit of the respective transmitter. The data communication between the contact units is independent of the wireless data transmission between the transmitter and receiver unit. The assignment of each transmitter to the respective transmitter holding position is executed automatically during a contact phase, wherein the receiver contact unit and the transmitter contact unit are brought into contact.

The assignment of each transmitter to the respective transmitter holding position can be accomplished in accordance with the automatic channel assignment as disclosed in EP-A-864293. Preferably, the receiver unit concurrently provides the assignment of each transmitter to the respective transmitter holding position as well as the automatic channel assignment during the same or a successive contact phase.

For the automatic transmitter holding position assignment, the receiver unit as well as the transmitter can be the master, or, in other words, the receiver unit as well as the transmitter can drive the assignment process. The master has the labeling preset and transfers its own labeling to the slave during the assignment process.

The invention thus allows a clear assignment and identification of transmitters relating to a specific receiver unit. Further, the invention provides a verification of the correct positioning of the transmitters to their corresponding receiver unit and, more particularly, to the respective transmitter holding positions of the corresponding receiver unit. It has been shown that the fixed assignment between transmitters and respective transmitter holding positions allows avoiding erroneous applications of transmitters caused by confusing the transmitters.

Although telemetry systems (in particular when applying the automatic channel assignment of EP-A-864293) theoretically allow that each transmitter can be remitted into any transmitter holding position, it has been proved that this 'degree of freedom' can lead to confusion of the handling personnel in particular in clinical environments, often with the serious results of false reading of measuring results from corresponding display units. It has to be understood that in most applications, the receiver unit is coupled with a corresponding display unit for displaying the measuring results of one or more of the transmitters assigned to the respective receiver unit. Most of the display units, again, allow displaying plural measuring results at the same time e.g. in split display segments. The arrangement of the multiple measuring results on the display unit normally stays fixed order at least as long as no further measuring result is to be displayed or one of the current measuring results is removed. Applying the principles of the invention now allows arranging the multiple measuring results on the display unit in the same order as the arrangement of the transmitter holding positions in the corresponding receiver unit. This arrangement remains the same at least as long as the arrangement of the transmitter holding positions remains unchanged. Thus, the personnel handling the telemetry system has a clear criterion of which measuring result belongs to which transmitter. Confusion resulting from an unclear and changing arrangement of the transmitter holding positions can thus be avoided.

In a preferred embodiment, each transmitter is furnished with a transmitter display and/or an acoustical warning unit for signaling when the transmitter is positioned in a 'wrong' transmitter holding position to which it is not assigned. The transmitter holding position might be 'wrong' either because it is a different receiver unit per se or because it is the right receiver unit but not the right transmitter holding position to which the transmitter is assigned.

The transmitter display preferably indicates, e.g. in form of a pictogram or the like, the right transmitter holding position (within the right receiver unit). In case that a transmitter is positioned in a 'wrong' transmitter holding position, the transmitter display of that transmitter preferably provides a warning signal e.g. in form of a blinking, flashing or the like.

In case that the transmitter is equipped with an acoustical warning unit, the acoustical warning unit preferably signals, e.g. by emitting an acknowledgement sound, when the transmitter is positioned in the right transmitter holding position (within the right receiver unit). Accordingly, when the transmitter is positioned in a 'wrong' transmitter holding position, the acoustical warning unit of that transmitter preferably emits a warning signal, e.g. in form of a specific warning sound or by modulating the frequency or amplitude of a standard sound such as the acknowledgement sound.

In another embodiment, the receiver unit is furnished with a receiver display and/or an acoustical warning unit for signaling when a transmitter is positioned in a 'wrong' transmitter holding position to which it is not assigned. The receiver display can be provided as a central receiver display and/or as individual displays arranged in close position to each transmitter holding position. In the former case, the central receiver display displays information for all transmitters assigned to the receiver unit. In the latter case, the individual displays each display only the information relating to the respective transmitter assigned to the respective transmitter holding position. Accordingly, the acoustical warning unit can be provided as a central acoustical warning unit and/or as individual acoustical warning units arranged in close position to each transmitter holding position.

In another preferred embodiment, each transmitter is furnished with a transmitter display and/or an acoustical warning unit, and the receiver unit is furnished with a receiver display and/or an acoustical warning unit. The above said then applies accordingly.

The displays, as well of the transmitters as of the receiver unit, may further provide indicators (such as labels) representing:
  a patient assignment (i.e. an indication of or a reference to the patient monitored) such as an alphanumeric representing the patient's bed, and/or
  a transmitter holding position indicator and/or
  a logical parameter grouping.

In general, the indicators can be numbers, alphanumeric codes, colors or symbols, and even sound or voice is possible.

In a preferred embodiment, a logical grouping of transmitters can be done by using different label presentations for different groups. Such grouping can be applied for distinguishing, for instance, between different types of transmitters (e.g. for sensing different physiological parameters such as pressure, heart rate, or gases) and/or between different applications of transmitters (e.g. for distinguishing between applications with different patients). The logical grouping preferably applies different colors for distinguishing different types of transmitters and/or numbers or other alphanumeric signs for distinguishing different applications of transmitters. This grouping can also be dynamic and some hierarchy can be used to make it easier to use. Such a hierarchic grouping can be implemented as follows: a dynamic identity (ID) code to assign transmitters and receivers to a patient, a dynamic physical holding position indicator on each transmitter and a parameter type grouping. The dynamic parameter grouping especially helps to make a large system (with many transmitters and receivers) more comprehensive. Such a dynamic assignment can also be combined with static elements like having the colors in the above examples fix and the patient identification dynamic.

In a configuration with a bi-directional link between the transmitters and the receiver unit(s) during normal operation (i.e. information exchange between the transmitter(s) and the receiver unit), a dynamic assignment can also take place during the normal operation and not only during a special programming phase. It is only important that corresponding system components (receiver and transmitter) always show the same labeling.

It is clear that the invention can be partly or entirely embodied by one or more suitable software programs, which can be stored on or otherwise provided by any kind of data carrier, and which might be executed in or by any suitable data processing unit.

BRIEF DESCRIPTION OF THE DRAWINGS

Other objects and many of the attendant advantages of the present invention will be readily appreciated and become better understood by reference to the following detailed description when considering in connection with the accompanied drawings. Features that are substantially or functionally equal or similar will be referred to with the same reference sign(s).

DETAILED DESCRIPTION OF THE INVENTION

In the following, a dynamic assignment and labeling scheme according to the invention shall be illustrated as implemented in a telemetry system for monitoring pregnant women in the labor and delivery ward of a hospital.

Figure 1:
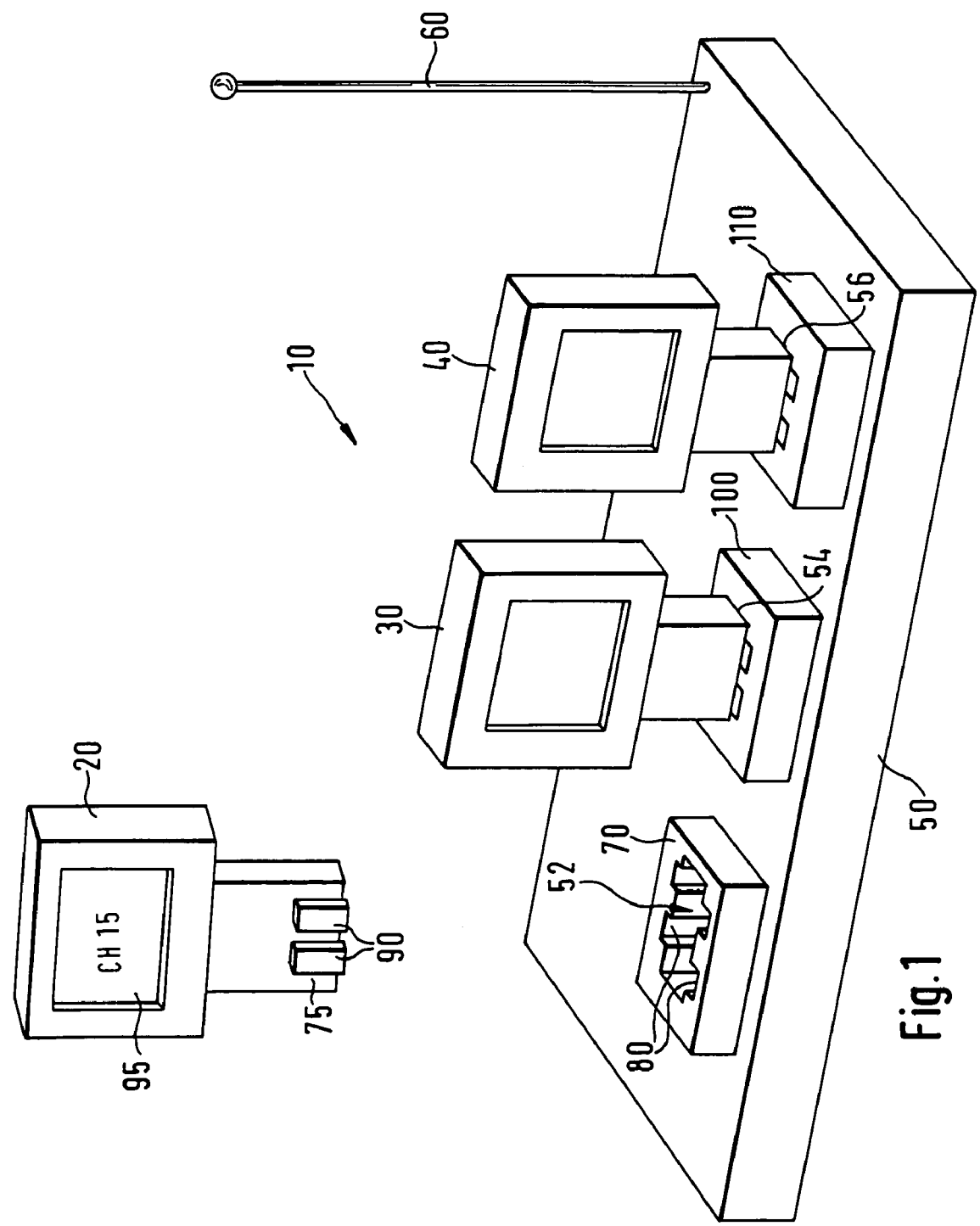
FIG. 1 shows a telemetry system 10 as described in EP-A-864293.

FIG. 1 shows a general view of a telemetry system 10, which has been described in detail in the aforementioned EP-A-864293. The teaching of that document describing the telemetry system shall be incorporated herein by reference.

The telemetry system 10 comprises at least one transmitter 20, and preferably a plurality of further transmitters 30 and 40. The telemetry system 10 further comprises a receiver unit 50, which is adapted to physically receive the plurality of transmitters 20 to 40 in slots 52, 54, and 56, respectively, e.g. in sense of a base station.

Each one of the transmitters 20 to 40 can be used to measure one dedicated parameter, such as fetal heart rate via ultrasound or ECG, uterine labor activity, maternal ECG, maternal oxygen saturation, or maternal blood pressure. Every combination of the transmitters 20 to 40 can be used according to the monitoring requirements. The transmitters 20 to 40—when operated—respectively transmit information (e.g. from a specific application such as measurement or monitoring purposes) via specific antennas (not shown in FIG. 1) to the receiver unit 50, which receives the signals, e.g. by an antenna 60. The receiver unit 50 might process or further transmit the received information e.g. to a standard monitor (not shown) to display parameters and waveforms. The operation of the transmitters will be explained for the example of transmitter 20. In order to prepare the transmitter 20 for transmission purposes in combination with the receiver unit 50, the transmitter 20 will be brought 'in contact' with the receiver unit 50. This phase is also called "contact phase". For that purpose, the receiver unit 50 comprises a receiver contact unit 70 for providing the contact with a transmitter contact unit 75 of the transmitter 20. During the contact phase, a data communication takes place between the receiver unit 50 and the transmitter 20 (to be prepared for use) by means of the contact units 70 and 75. The contact units 70 and 75 respectively comprise corresponding components for establishing and providing a communication therebetween by any means and ways as known in the art, such as electrically or by an infrared, radio or ultrasound link, whereby the communication can be either unidirectional or bi-directional. In FIG. 1, the receiver unit 50 comprises the receiver contact unit 70 for the transmitter 20, a receiver contact unit 100 for the transmitter 30, and a receiver contact unit 110 for the transmitter 40.

In a preferred embodiment as shown in FIG. 1, the receiver contact unit 70 comprises one or more contact areas 80 and the transmitter contact unit 75 comprises one or more contact areas 90, which—when brought into contact—establish a direct electrical contact between the contact units 70 and 75. It is clear that the contact areas 80 and 90 are represented in FIG. 1 only schematically and may comprise a plurality of individual contacts, e.g. as known from serial or parallel computer interfaces.

During the contact phase, the receiver unit 50 transfers information to the transmitter 20, such as a free channel to be used by the transmitter 20 for communicating with the receiver unit 50, a unique transmitter identity (ID) code for the transmitter 20, an ID code of the receiver unit 50, information about a standby mode, personal information e.g. about the person who will receive or carry the transmitter 20 for a medical application. The transmitter 20 preferably acknowledges a valid reception of the received data, e.g. by echoing or the like.

After the contact phase, the transmitter 20 may be removed from the receiver unit 50 and the contact units 70 and 75, e.g. the contact areas 80 and 90, will be separated. The transmitter 20 is now ready for operation and might start transmitting to the receiver unit 50.

The transmitter 20 and/or the receiver unit 50 may contain a display or other means for making information visible. This allows to display certain information such as a number of the selected channel, the ID code(s), or the personal information transferred from the receiver unit 50, thus giving the operator useful feedback about the 'programming' of the transmitter 20 and/or whether the programming has been successful. In medical applications, the display may show the patient's name or a bed label, coming e.g. from a central station via a network into the receiver unit 50 and therefrom to the transmitter 20. In FIG. 1, the transmitter 20 comprises a display 95 indicating, as an example, a patient assignment "CH 15" (or another unique symbol) as the channel number selected by the receiver unit 50 for the transmitter 20.

In a specific embodiment, the transmitter 20 can be manually shut down or brought into a standby mode, e.g. by short contacting (e.g. for a defined period of time such as less than two seconds) the contact areas 80 and 90 of the receiver unit 50 and the transmitter 20.

The communication between the receiver unit 50 and the transmitter 20 during the contact phase can take place, e.g. while recharging a battery of the transmitter 20. In that case, the receiver contact unit 70 may be implemented in a charging slot of the receiver unit 50, and the transmitter contact unit 75 may be implemented at a thereto-corresponding location.

Figure 2:
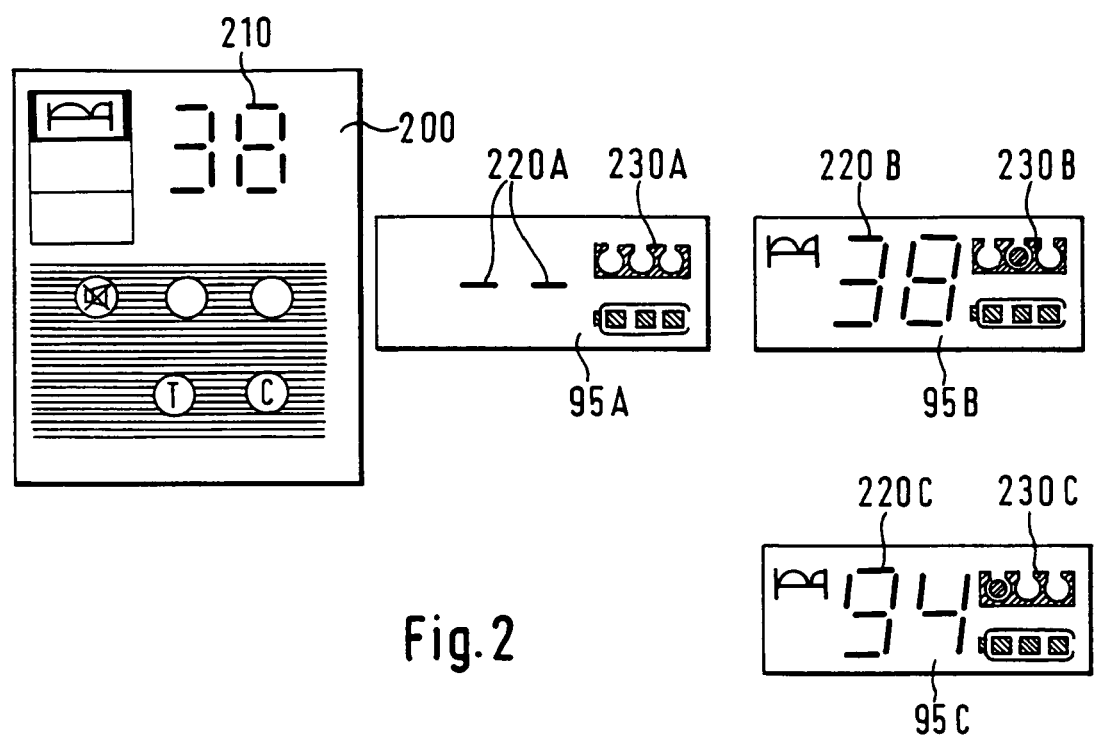
FIG. 2 illustrates a preferred embodiment of the invention for labeling the receiver unit 50 and the corresponding transmitters 20–40.

According to the invention, each one of the transmitters 20–40 is assigned during the contact phase to the respective slot 52–56 (as the corresponding transmitter holding position), into which the transmitter has been placed during the contact phase. The respective assignment of each transmitter 20–40 to the respective slot 52–56 is indicated by means of dynamic labels communicated during the contact phase. FIG. 2 illustrates a preferred embodiment for labeling the receiver unit 50 and the corresponding transmitters 20–40. For that purpose, the receiver unit 50 as well as the transmitters 20–40 comprise adequate display means, such as a central receiver display 200 and a display 95A–95C for the transmitters 20–40 (corresponding to the display 95 as shown in FIG. 1). In the example of FIG. 2, the transmitter 20 (display 95A) is unprogrammed, the transmitter 30 (display 95B) is programmed, and the transmitter 40 (display 95C) is programmed by a different receiver unit.

The following assignments and labels are used in the example as shown in FIG. 2. The receiver unit 50 has a unique ID label (unique within the hospital) which will be displayed in an ID label display field 210. This ID label display field 210 preferably is a two-digit number field displayed on the receiver display 200. In the example of FIG. 2, the ID label display field 210 shows 38 as the ID label. Each transmitter is programmed to this ID number during the contact phase, when placed in that specific receiver unit. Each transmitter also has a corresponding (preferably two digit) ID number display field 220A–220C for showing the respective ID number to which it has been programmed. In the example of FIG. 2, the ID label display field 220A of the display 95A shows dashes since the transmitter 20 is not assigned to a receiver. The ID number display field 220B of the display 95B shows 38 as ID label corresponding to the receiver unit 50. The ID number display field 220C of the display 95C shows 94 as ID label corresponding to a different receiver unit.

Since each receiver unit is normally applied for one patient only, the ID label clearly assigns each transmitter to the patient and the corresponding receiver unit. Accordingly, each transmitter used on one patient must show the same ID label. This can easily be checked on the transmitter displays 95.

A slot label or holding position indicator 230 is used as a second label to indicate on each transmitter 20–40 to which one of the slots 52–56 of the multi-channel receiver unit 50 it belongs, or, in other words, in which one of the slots 52–56 it has been programmed during the contact phase. The holding position indicator 230 preferably uses a symbolized display to intuitively indicate the respective slot 52–56. In the example of FIG. 2, three circles represent the transducers, whereby a full circle indicates the correct slot position for the transmitter. This information helps the user to place back a transmitter into the correct receiver slot after use, or to identify a certain transmitter if a transmission problem occurs with this specific transmitter e.g. as indicated by a receiver status display 300 (not shown in the figures) for displaying the actual status of the transmission channel individually for each slot.

In the example of FIG. 2, a holding position indicator 230A of the display 95A shows three empty circles indicating the transmitter 20 is not assigned to any receiver. A slot label 230B of the display 95B shows a full circle between two empty circles, thus indicating that the transmitter 30 is assigned to the middle slot 54 of the receiver unit 50. A holding position indicator 230C of the display 95C shows a full circle to left of two empty circles, thus indicating that the transmitter 40 is assigned to the left holding position of the receiver unit with the ID label 94.

Figure 3:
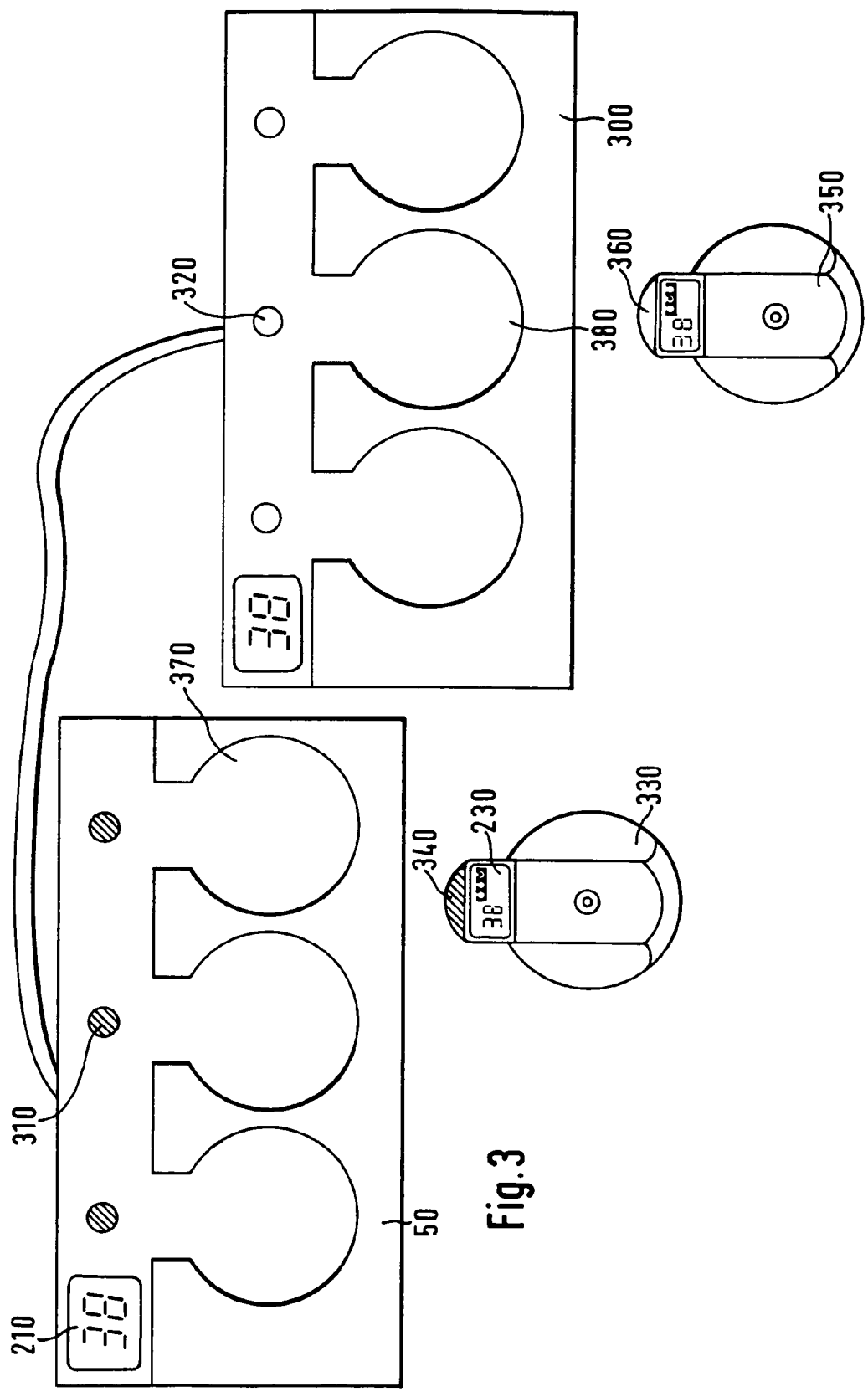
FIG. 3 depicts an embodiment with two receiver units connected together.

The receiver unit 50 is designed to have three physical slots or holding positions 52–56, and can operate with three different transmitters 20–40 for one patient simultaneously. If more parameters are required, a second receiver unit 300 can be connected to the receiver unit 50 thus forming a receiver unit with six holding positions, as shown in FIG. 3. In this case, color-coding can be applied to distinguish the two receiver units 50 and 300 and their corresponding transmitters. In the example of FIG. 3, the receiver unit 50 is coded with dark dots 310, and the receiver unit 300 is coded with light dots 320. Accordingly, a transmitter 330 assigned to the receiver unit 50 is coded with a corresponding (dark) color field 340, and a transmitter 350 assigned to the receiver unit 300 is coded with a corresponding (light) color field 360. For the sake of completeness, the transmitter 330 is assigned to a slot 370 (as indicated by the full right circle in the corresponding slot label 230), and the transmitter 350 is assigned to a slot 380 (as indicated by the full middle circle in the corresponding slot label 230).

What is claimed is:

1. A receiver unit for providing a communication in a telemetry system, comprising:
   a plurality of transmitter holding positions, each adapted for receiving a transmitter adapted for providing a wireless communicating with the receiver unit, and
   means for assigning one of the transmitter holding positions to the transmitter received in that transmitter holding position wherein the assignment between the transmitter and the transmitter holding position is maintained during the wireless communication.

2. The receiver unit of claim 1, further comprising warning means for providing a warning signal when the transmitter is placed into a transmitter holding position to which it has not been assigned.

3. The receiver unit of claim 1, further comprising a receiver contact unit for each transmitter holding position, whereby each receiver contact unit is adapted to provide a data communication with a corresponding transmitter contact unit of the respective transmitter.

4. The receiver unit of claim 3, wherein the data communication between the contact units is independent of the wireless data transmission between the transmitter and the receiver unit.

5. The receiver unit of claim 1, further comprising a receiver display for signaling when a transmitter is positioned in a transmitter holding position to which it is not assigned.

6. The receiver unit of claim 1, further comprising an acoustical warning unit for signaling when a transmitter is positioned in a transmitter holding position to which it is not assigned.

7. A receiver unit for providing a communication in a telemetry system, comprising:
a plurality of transmitter holding positions, each adapted for receiving a transmitter adapted for providing a wireless communicating with the receiver unit, and means for assigning one of the transmitter holding positions to the transmitter received in that transmitter holding position wherein the assignment between each transmitter and the respective transmitter holding position is maintained during the wireless communication until a new assignment will be made, or until the present assignment is reset or otherwise suspended or canceled.

8. A transmitter adapted for providing a wireless communication with a receiver unit in a telemetry system, wherein the receiver unit comprises a plurality of transmitter holding positions, each adapted for receiving one transmitter, the transmitter comprising:
means for assigning the transmitter holding position to the transmitter received in that transmitter holding position wherein the assignment of the transmitter holding position is maintained during the wireless communication.

9. The transmitter of claim 8, further comprising a transmitter display for signaling when the transmitter is positioned in a transmitter holding position to which it is not assigned.

10. The transmitter of claim 9, wherein the transmitter display comprises means for indicating the correct transmitter holding position.

11. The transmitter of claim 10, wherein the means for indicating the correct transmitter holding position comprises a pictogram.

12. The transmitter of claim 8, further comprising an acoustical warning unit for signaling when the transmitter is positioned in a transmitter holding position to which it is not assigned.

13. A telemetry system comprising:
a receiver unit including a plurality of transmitter holding positions, each adapted for receiving a transmitter, and
means for assigning one of the transmitter holding positions to the transmitter received in that transmitter holding position;
the transmitter comprising:
means for assigning the transmitter holding position to the transmitter received in that transmitter holding position; each of the transmitter units being adapted for providing a wireless communicating with the receiver unit
wherein the assignment between the transmitter and the transmitter holding position is maintained during the wireless communication.

14. A method for assigning a transmitter to a respective transmitter holding position in a telemetry system of claim 13, comprising the steps of:
bringing a receiver contact unit of the respective transmitter holding position and a transmitter contact unit of the transmitter into contact, and
automatically assigning the transmitter to the respective transmitter holding position during said contact.

15. A receiver unit for providing a communication in a telemetry system, comprising:
a plurality of transmitter holding positions, each adapted for receiving a transmitter adapted for providing a wireless communicating with the receiver unit, and
means for assigning one of the transmitter holding positions to the transmitter received in that transmitter holding position,
wherein the transmitter holding positions are insertion slots and wherein the assignment between the transmitter and the transmitter holding position is maintained during the wireless communication.

16. A transmitter adapted for providing a wireless communicating with a receiver unit in a telemetry system, wherein the receiver unit comprises a plurality of transmitter holding positions, each adapted for receiving one transmitter, the transmitter comprising:
means for assigning the transmitter holding position to the transmitter received in that transmitter holding position,
wherein the transmitter holding positions are insertion slots and wherein the assignment between the transmitter and the transmitter holding position is maintained during the wireless communication.

17. A telemetry system comprising:
a receiver unit including a plurality of transmitter holding positions, each adapted for receiving a transmitter, and
means for assigning one of the transmitter holding positions to the transmitter received in that transmitter holding position;
the transmitter comprising:
means for assigning the transmitter holding position to the transmitter received in that transmitter holding position; each of the transmitter units being adapted for providing a wireless communicating with the receiver unit,
wherein the transmitter holding positions are insertion slots and wherein the assignment between the transmitter and the transmitter holding position is maintained during the wireless communication.

* * * * *